(12) United States Patent
Koptenko et al.

(10) Patent No.: US 8,199,981 B2
(45) Date of Patent: Jun. 12, 2012

(54) METHODS AND SYSTEMS FOR SEGMENTATION USING BOUNDARY REPARAMETERIZATION

(75) Inventors: Sergei Koptenko, Verdun (CA); Martin Lachaine, St. Laurent (CA); Xing Huang, Montreal (CA); Tony Falco, La Prairie (CA)

(73) Assignee: Elekta Ltd., Montreal, Quebec (CA)

( * ) Notice: Subject to any disclaimer, the term of this patent is extended or adjusted under 35 U.S.C. 154(b) by 1077 days.

(21) Appl. No.: 11/804,594

(22) Filed: May 18, 2007

(65) Prior Publication Data

US 2008/0008369 A1    Jan. 10, 2008

Related U.S. Application Data

(60) Provisional application No. 60/801,317, filed on May 18, 2006.

(51) Int. Cl.
*G06K 9/00* (2006.01)
(52) U.S. Cl. .................................. 382/128
(58) Field of Classification Search ............ 382/128, 382/152, 224, 190, 173, 131, 132
See application file for complete search history.

(56) References Cited

U.S. PATENT DOCUMENTS

| | | | |
|---|---|---|---|
| 5,859,891 A | 1/1999 | Hibbard | |
| 6,094,508 A * | 7/2000 | Acharya et al. | 382/199 |
| 6,785,409 B1 * | 8/2004 | Suri | 382/128 |
| 2004/0184646 A1 * | 9/2004 | Oosawa | 382/128 |
| 2006/0093205 A1 * | 5/2006 | Bryll et al. | 382/152 |

FOREIGN PATENT DOCUMENTS

WO    WO-9952074 A1    10/1999

OTHER PUBLICATIONS

Patrick Brigger, Jeff Hoeg, Michael Unser; B-Spline Snakes: A flexible tool for parametric contour detection; Sep. 2000; IEEE transactions on image processing, vol. 9, No. 9.*
Supplementary European Search Report—dated May 7, 2010 (4 pages).
International Search Report for PCT/CA2007/000898 dated Aug. 20, 2007 (3 pages).
Written Opinion of the International Searching Authority for PCT/CA2007/000898 (6 pages).
European Office action, Application No. 07719820.8, dated Oct. 27, 2011, 4 pages.

* cited by examiner

*Primary Examiner* — Claire X Wang
(74) *Attorney, Agent, or Firm* — Goodwin Procter LLP

(57) ABSTRACT

Representations of a segmented, contoured organ or lesion are obtained from two-dimensional or three-dimensional images. A contour within the image of the lesion or organ of interest is used to identify a region around the initial contour and transform it into a boundary image comprising sampling lines that contain points identifying the organ boundary.

28 Claims, 8 Drawing Sheets

METHODS AND SYSTEMS FOR SEGMENTATION USING BOUNDARY REPARAMETERIZATION

CROSS-REFERENCE TO RELATED APPLICATION

This application claims priority to and the benefit of, and incorporates herein by reference, in its entirety, provisional U.S. patent application Ser. No. 60/801,317, filed May 18, 2006.

TECHNICAL FIELD

This invention relates to methods and systems for identifying anatomical features in medical images, and more specifically to using various segmentation and mapping techniques to accurately identify boundaries in the images.

BACKGROUND INFORMATION

Imaging modalities such as computed tomography (CT), magnetic resonance imaging (MRI), ultrasound, positron emission tomography (PET) and single-photon emission computed tomography (SPECT) provide various representations of anatomical features of a subject. Image sets generated with any of these modalities can be used for diagnosis or to guide various treatments, such as surgery or radiation therapy. The images can consist of two-dimensional representations, three-dimensional voxel images, or a series of temporal three-dimensional images. It is often preferable to contour or segment organs or lesions within the images, thus allowing calculation of volumes, improved visualization, and more accurate treatment planning. It also facilitates the modification of treatments for image-guided surgery or radiotherapy.

However, because of the complexity of these systems and various characteristics of the resulting images, interpretation typically requires a skilled and highly-trained physician. In one conventional approach, for example, images are segmented by an individual (such as the physician) by using a pointing device (e.g., a mouse) to select various points on the surface of an organ, or by electronically "painting" the image using a paintbrush tool. Three-dimensional images can be contoured by repeating the process on various two-dimensional slices throughout the organ to create a three-dimensional surface. The process, however, is time-consuming and prone to user variability.

Many automatic segmentation algorithms have been disclosed in the literature, and are familiar to those practicing the art. Each is usually adapted to a particular imaging modality or organ type, with varying success. In particular, medical ultrasound images are intrinsically difficult for segmentation algorithms. Organ boundaries can be masked by the presence of speckle noise; parts of the boundary may appear weak due to shading by overlying features; and edges can be formed by two regions of different gray levels or as the edge between two different textures, or as a hybrid of the two. This complexity leads to high failure rates for conventional automatic segmentation algorithms. A fast and robust automatic segmentation algorithm, which acts on two-dimensional or three-dimensional images, is therefore needed.

SUMMARY OF THE INVENTION

The present invention provides systems and methods to obtain a segmented, contoured organ or lesion from two-dimensional or three-dimensional images. The following embodiments are described with respect to two-dimensional images, it being understood that the approach of the present invention can be extended to three-dimensional images as discussed below.

In general, a contour within an image of a lesion or organ of interest is identified, and a region or "band" around the initial contour is then defined. The band is transformed into a boundary image in the form of a rectangular array. The boundary image comprises sampling lines, such as columns within the image. For example, each sampling line can originate on the inside of the organ and end on the outside of the organ, in which case each line contains at least one point (an edge point) of the organ boundary. Features of the boundary image are found, and these features are then transformed back into the original image, thus resulting in improved image segmentation.

Each sampling line can be analyzed independently or concurrently, and local thresholds (e.g., thresholds calculated from each line's pixels statistics) can be used to construct a complete boundary of the lesion or organ in the image. A contrast-stretch or gamma-correction operation, for instance, can be applied on a line-by-line basis. In addition, the boundary image can be analyzed as a whole using any number of conventional image-analysis techniques. In certain embodiments, the edge-detection process includes reducing a two-dimensional curve-fitting on the image to an iterative one-dimensional line approximation. Furthermore, because the data is considered "directional" (i.e., the edge points are found by moving from inside the contour to outside the contour along the sampling lines), the data array becomes anisotropic, and an edge can be determined by traversing the data in the appropriate direction.

The methods described herein may include using a constant local threshold (CLT) approach, which employs a threshold estimate based on the combination of local and global statistics to binarize the boundary image and further facilitates cleaning of these binary images to find the edge curve in boundary space.

In one aspect, therefore, the invention provides a method for segmenting images (either two-dimensional or three-dimensional images obtained using an imaging modality such as, for example, a CT scanner, an ultrasound device, a PET scanner, a SPECT scanner or an MRI) of anatomical structures (e.g., lesions, tumors and/or organs) that includes providing an initial border estimate of the structure (either by arbitrarily defining the estimate, using a user-provided estimate or set of points, or automatically determining the estimate), determining a border band that encompasses the border estimate, segmenting the border band, and mapping the segmented border band onto the image to produce a segmented border estimate.

In embodiments in which the image is three-dimensional, the image may be divided into a series of two-dimensional images which may in turn be used to create a series of two-dimensional segmented border estimates, from which a three-dimensional mesh may be created.

In some embodiments, a tolerance difference can be calculated (based on statistical measurements of the image, for example) between the segmented border estimate and the initial estimate to determine the accuracy and/or error of the segmented estimate. The method can be repeated by using the segmented border estimate as the initial estimate in a subsequent iteration, and this iterative estimation process can continue until the tolerance difference is below a predetermined threshold (which may, if desired, change from iteration to iteration). In some implementations, the border band may also be adjusted from iteration to iteration by expanding or contracting the initial border estimate in various directions and/or by various amounts. Determination of the border band can include sampling image data along a series of lines normal to the initial border estimate and mapping the sampled data into a rectangular array. The sampling lines may also be co-radial or curved.

Segmenting the border band may, in some embodiments, include calculating a weighted-sum image using global and/or local statistics of the image; applying thresholds to the weighted-sum image, thereby forming a binary image; detecting an edge curve on the binary image; and modifying data points along the edge curve. The statistical measurements used to calculate the thresholds can include using an actual or mean of the weighted sum of the image, gradient-edge detection methods, Laplacian edge-detection methods and/or second-derivative gradient-filtering methods. Techniques for segmenting the border band may include using level sets, active contours, texture information, active shapes, deformable templates, graph-based techniques, statistical clustering, Markov random field-based techniques and active-appearances methods, thresholding of the border band, gradient-edge detection and/or Laplacian-edge detection to detect an edge in the border band.

The image can be modified by, for example, removing false binary islands, modifying data points along the edge curve by removing false concavities, removing erroneous edge points and/or fitting a spline curve through identified edge points.

In another aspect, the invention provides a system for segmenting representations of an anatomical structure (e.g., a lesion, organ and/or tumor) in an image. Embodiments of the system include a register for receiving the image and an initial border estimate of the anatomical structure represented in the image, and a mapping module for determining a border band including the initial border estimate of structure, segmenting the border band, and mapping the segmented border band onto the image, thus providing a segmented border estimate.

The system may also include a processor for segmenting the border band, and in some embodiments, the processor and mapping module iteratively segment and map the segmented border band using the new border estimate as the initial border estimate for subsequent iterations.

In another aspect, the invention provides software in computer-readable form for performing the methods described herein.

The foregoing and other objects, features and advantages of the present invention disclosed herein, as well as the invention itself, will be more fully understood from the following description of preferred embodiments and claims, when read together with the accompanying drawings.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
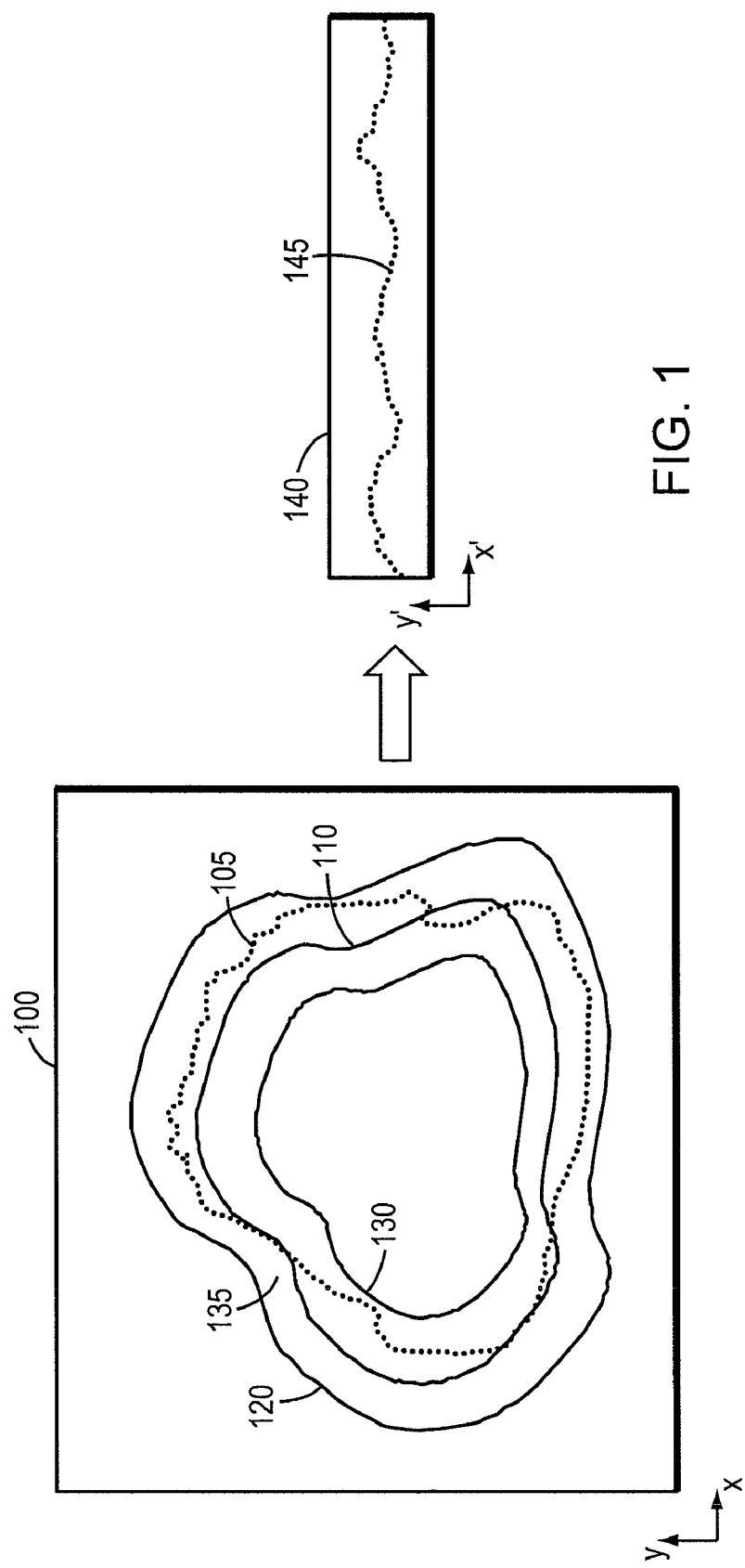
FIG. 1 is a schematic diagram illustrating the conversion of a contour to a boundary image in accordance with various embodiments of the invention.

Referring to FIG. 1, an image 100 of an organ or lesion 105 is used to plan and/or assist with various medical procedures. The image 100 can be an individual two-dimensional image, a two-dimensional sectional image or slice through a three-dimensional image, a three-dimensional image, or any combination thereof. The image 100 can be obtained using one or more devices such as a CT scanner, an ultrasound device, an MRI device, a PET scanner, and/or an x-ray device, or any other suitable imaging modality as commonly used in the art. The image 100 may be used by an oncologist, physician, or radiation technician to determine a diagnosis, the location and shape of the lesion 105 to be treated and/or to determine the parameters of a radiation treatment plan such as beam angle, beam shape, the number of beams needed to administer a sufficient radiation dose to eradicate the target lesion 105, the dose level for each beam, as well as patient positioning parameters.

In accordance with the invention, an initial boundary 110 is defined in the image 100 in order to approximate the contour of the lesion 105. The position and/or shape of the initial boundary 110 can be defined by the user, programmatically identified as a shape (e.g., a circle of arbitrary radius) within the organ on which lesion 105 is located, and/or based on an organ model. In some embodiments, the initial boundary 110 is provided as a previously segmented image, and in some cases is combined with other images or portions thereof. As used herein, a "segmented image" means an image with a corresponding contour or contours identified therein. In a two-dimensional image, for example, the contours may be represented as points, line segments, pixels, an analytical curve, or a list of pixels within each contour. Similarly, in a three-dimensional image, the contours may be represented as a mesh, or a list of voxels within each contour. The contours typically represent areas of interest within the image, and usually correspond to organs or lesions in medical images.

An outer contour 120 and an inner contour 130 are generated, and these contours define the extent of a stripe 135, or boundary region, within the image 100. In some embodiments such as those where an approximation of the organ or lesion already exists, the contours 120 and/or 130 generally follow the initial boundary 110, whereas in other embodiments, the contours 120 and/or 130 are unrelated to the shape of the initial boundary 110. This closed stripe 135 is then opened topologically into a rectangular boundary image 140 comprising some or all of the lesion boundary 145. In other words, the two-dimensional shapes of both the boundary stripe 135 and the contour of lesion 105 are lost as they are linearized, but the fine structure of the lesion contour—i.e., the relationship of each contour pixel to its neighbor—is retained. This process is referred to as boundary re-parameterization (BRP). In the boundary image 140, a new coordinate grid may be defined with the x' axis defining the direction of linearization and the contour fine structure extending along the y' axis.

Figure 2:
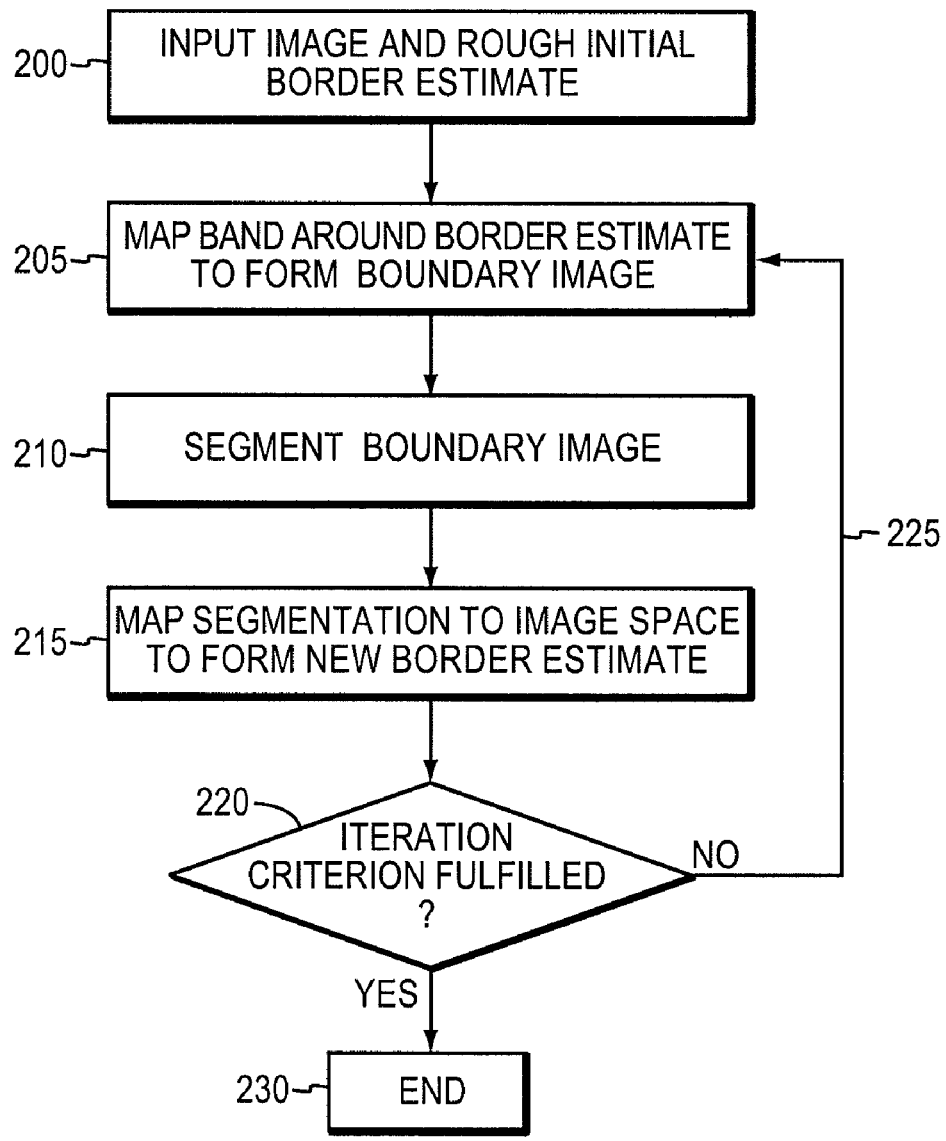
FIG. 2 is a flowchart depicting the steps of the boundary reparameterization technique in accordance with various embodiments of the invention.

Due to imperfections in the imaging process, the lesion boundary 145 typically contains noise and other irregularities that do not correspond to the true boundary of the lesion 105. Accordingly, the boundary image 140 may be iteratively segmented to create a smooth approximation of the true boundary. FIG. 2 illustrates a representative procedure for creating the boundary image 140 and segmenting it. With reference to FIGS. 1 and 2, an initial estimate of the boundary 110 is produced (step 200) from manually entered and/or automatically derived edge-detection data. In some cases, the initial estimate may be a shape (e.g., a circle) of arbitrary size placed within the boundaries of the organ of interest. In step 205, the image pixels in the band 135 around the boundary estimate are remapped from image space to boundary-space coordinates (or transformed from global to local coordinates), creating the rectangular boundary image 140. The boundary image is then segmented (step 210) by finding salient y'-direction features along lesion boundary 145 that are likely to represent noise or other imaging artifacts. The segmented image can then be mapped from boundary space back to image space to produce a new boundary estimate (step 215)—essentially the reverse operation of step 205. The segmented image, in other words, provides a more accurate approximation of the lesion boundary 145 and can be used as an initial boundary estimate in a subsequent iteration.

For example, the process starts with an initial imperfect guess of the organ's boundary, such as a circle. A circular band is then defined that includes the real boundary, although the exact boundary is not known. The band is "unwound" into a rectangular image, in which the real boundary is estimated by identifying transition points within the unwound image (along gradients, for example) using, for example, the thresholding techniques described below. This estimate can then be used as the boundary estimate for a next iteration, as the approximation is closer to the realistic boundary than the initial estimate, and thus the band used to create the rectangular image will conform closer to the desired boundary. As the number of iterations increases, the boundary estimate converges to a flat, straight line in rectangular space.

In step 220, if an iteration criterion is not fulfilled, the process returns to step 205 with the new estimate of boundary 145 as input. Otherwise, the new boundary estimate is used as the boundary 145 (step 230). The iteration criterion can be, for example, to perform a fixed number of iterations, or in other cases can be a smoothness criterion or tolerance level for incremental changes of the boundary curve 145. Parameters of the process can be varied for each iteration. For example, the size and/or shape of the boundary region 140 can be increased, decreased or modified with each iteration since the algorithm does not have to search as far as the result converges towards the actual boundary.

Figure 3:
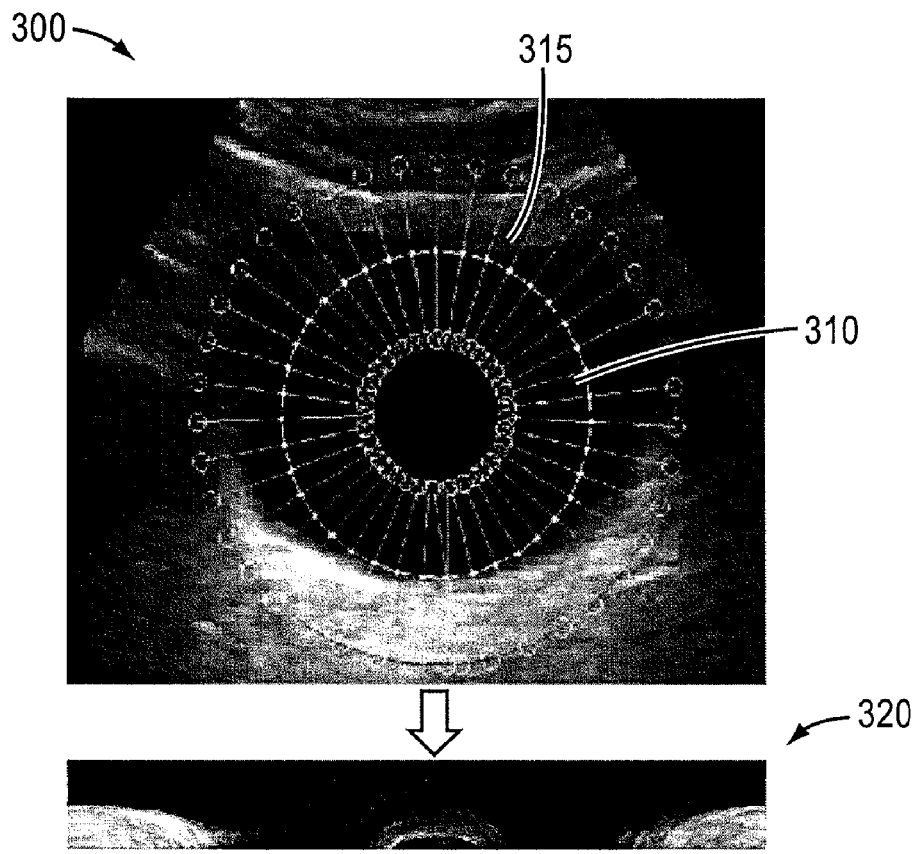
FIG. 3 is an image of a lesion to which the techniques of the invention can be applied.

The remapping of image pixels from image space to boundary space (step 205) can be accomplished using any of a number of approaches. One technique, illustrated in FIG. 3, uses continuous quadrilateral mapping whereby the boundary region around the boundary estimate 310 of image 300 is separated into a series of quadrilaterals 315. The quadrilaterals can then be transformed into a series of squares to form the boundary image 320.

Figure 4:
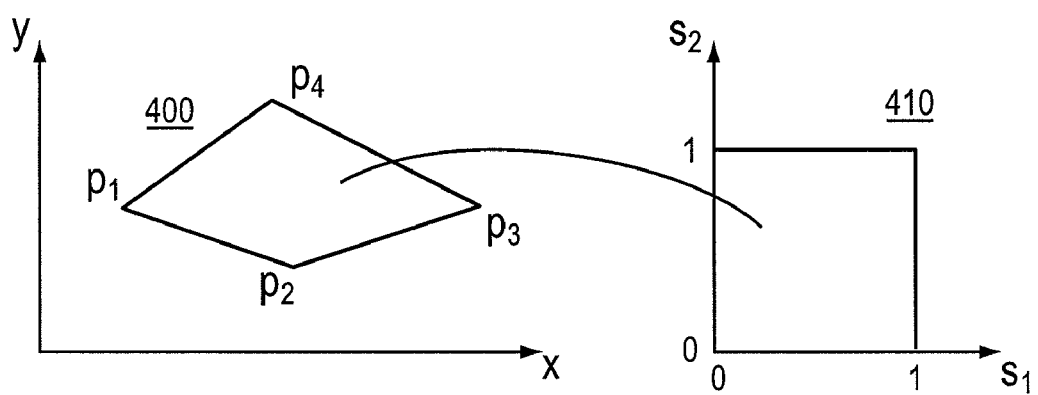
FIG. 4 is a schematic diagram illustrating a mapping from a quadrilateral to a square in accordance with various embodiments of the invention.

Referring to FIG. 4, continuous quadrilateral mapping may be performed as follows. An original quadrilateral segment 400 having global image coordinates (x,y) corresponds to a square 410 having coordinates ($s_1,s_2$), where $s_1$ and $s_2$ are range from 0 to 1. The axes $s_1$ and $s_2$ are subdivided into a regular grid, and the value at each grid point ($s_1,s_2$) is evaluated by finding the corresponding point (x,y) through equation 1:

$$\begin{pmatrix} x \\ y \end{pmatrix} = \sum_{i=1}^{4} \xi(s_1, s_2) \begin{pmatrix} x_i \\ y_i \end{pmatrix} \qquad \text{Equation 1}$$

where $p_i=(x_i,y_i)$ are the coordinates of the four vertices of the quadrilateral, and $\zeta_1(s_1,s_2)=(1-s_1)(1-s_2)$ $\zeta_2(s_1,s_2)=(1-s_1)s_2$ $\zeta_3(s_1,s_2)=s_1(1-s_2)$ $\zeta_4(s_1,s_2)=s_1 s_2$.

Other suitable approaches for transforming boundary regions from image space to boundary space include sampling the image along lines normal to the points in the initial boundary curve and assembling the sample lines into a rectangular array; sampling the image along lines (straight and/or curved) having a common point on the boundary, thus creating a boundary estimate line for the boundary point and assembling the sample lines into a rectangular array; and splitting the region surrounding the initial boundary into a plurality of triangular segments, mapping the triangles into squares, and assembling the squares into a rectangular array.

Converting a boundary region to a rectangular boundary space image may result in the loss of circular continuity. That is, the first and last points of the line in boundary space correspond to neighboring points in image space, and if no constraint is imposed, this may induce a discontinuity of the contour in image space. One way of addressing this possibility is to replicate a section of the boundary image and concatenate it on either side of the boundary image. In this case, the extreme points of the boundary line will have the same image information and more likely converge to the same value. Another approach is to directly impose a strict constraint that the first and last points must correspond to the same value.

Figure 5:
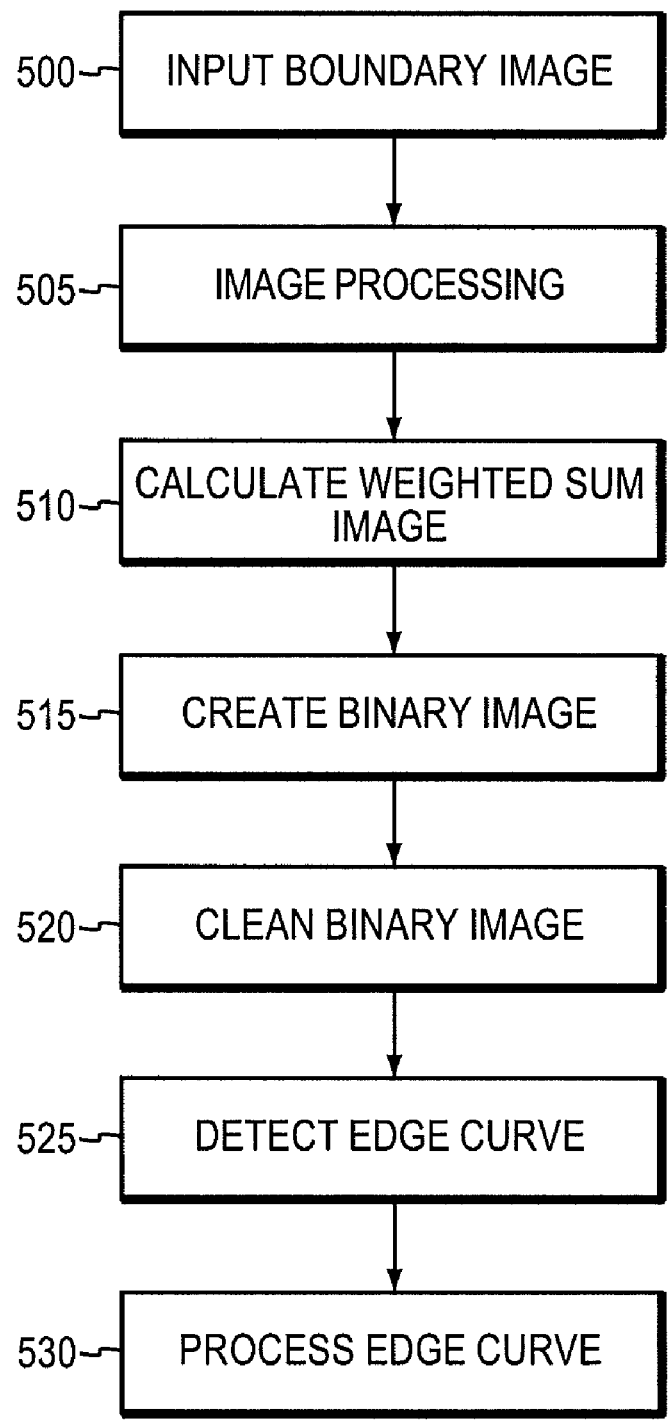
FIG. 5 is a flowchart depicting the steps of the CLT method in accordance with various embodiments of the invention.

In various embodiments of the invention, a constant local threshold (CLT) technique may be used to segment the boundary images (i.e., step 210), combining local and global image statistics to derive a threshold for edge detection. In overview, and with reference to FIG. 5, the CLT technique starts with the boundary image 145 (see FIG. 1) generated from the BRP process as input (step 500); in certain instances, various image-processing techniques can be applied (step 505) to the boundary image. A weighted-sum image is created (step 510), representing the sum of the globally and locally normalized boundary images. The boundary image is then converted to a binary boundary image (step 515) using one or more thresholds calculated from image statistics. Using conventional image-processing techniques, the binary image can also be processed to reduce noise and clutter (step 520). The edge curve is detected (525), and then processed using standard image-processing methods (described further below) to produce a smooth estimate of the edge curve (step 530), resulting in the final boundary estimate to be fed back to the BRP process. The individual steps of the CLT technique will now be described in greater detail.

Step 505 may involve any number of image-processing techniques. In one embodiment, a threshold is applied to the lesion boundary 145 from the bottom to reduce noise. In some cases, a very low (or no) threshold is used due to the risk of removing edge information along with the noise. Contrast stretching can then be performed by identifying the maximum and minimum pixel values along lesion boundary 145 as well as the "next to minimum" and "next to maximum" contrast values. By identifying this secondary set of maxima, possible noise spikes (e.g., the initially identified maximum) are eliminated and the likelihood of obtaining the correct maximum is improved. Methods of determining proper or desired thresholds can include gradient edge-detection methods, Laplacian edge-detection methods or second-derivative gradient-direction edge-filter methods, for example.

Whereas the minimum value in the entire image is typically associated with the image background (and is thus zero), the minimum contrast value in the image of the organ or lesion can be other than zero. Therefore, the second-lowest value may be used as the minimum, leading to a more robust estimate of the contrast minimum. The range of contrast values MAX-MIN is then calculated and one or more thresholds applied to the image to allow for a variation reflecting a desired degree of smoothness (e.g., 5%). In some embodiments, the threshold applied to the MAX contrast value differs from that applied to the MIN contrast value. The values may be normalized using, for example, a procedure such as global normalization, resulting in an image (herein referred to as "image G") having a minimum value equal to zero and a maximum value equal to one. In some embodiments, image G is then gamma corrected. Image G is smoothed using, for example, a low-pass or median filter acting along the rows of the image to smooth the pixels in the most probable direction of boundary curve propagation. Unlike other edge-detection methods, this technique does not require heavy smoothing and thus, there is no significant loss of resolution and all details on the image are substantially preserved. In some embodiments, other suitable image processing operations, such as brightness correction or histogram normalization, may also be applied to the image G.

In one embodiment of the invention, the calculation of the weighted-sum image (step 510) is performed as follows. The boundary image G is globally normalized using a normalizing factor (e.g., 1), and the locally normalized image (herein referred to as "image L") is obtained by renormalizing each column (or sampling line) of image G to a maximum value, which in some cases may be the same as the normalizing factor. A weighted normalized image W can then be defined by summing image G and image L, using a weight w (where w≦1), i.e., W=w×L+(1−w)×G. The value of w is a free parameter, typically defined between 0.25 to 0.75. By varying the weight, the proportions of the image that are globally and locally normalized can be controlled in the output image.

In some embodiments, the threshold in step 515 of the CLT technique is calculated from the weighted boundary image W. In one embodiment it is calculated as the mean of W. This produces an adaptive threshold that depends on global image statistics (e.g., the mean of the boundary image) and, desirably, on local information using the amplification of local features through local normalization. Such a combination is robust in delivering edge estimation for a wide variety of ultrasound images, for example. In some embodiments, the threshold of the first iteration is kept constant for future iterations, since the mean value of the boundary image increases as the correct boundary is approached. This is due to the decreasing width of the boundary region 140 based on the diminishing amplitude of the boundary 145 as the correct boundary is approached.

Figure 6:
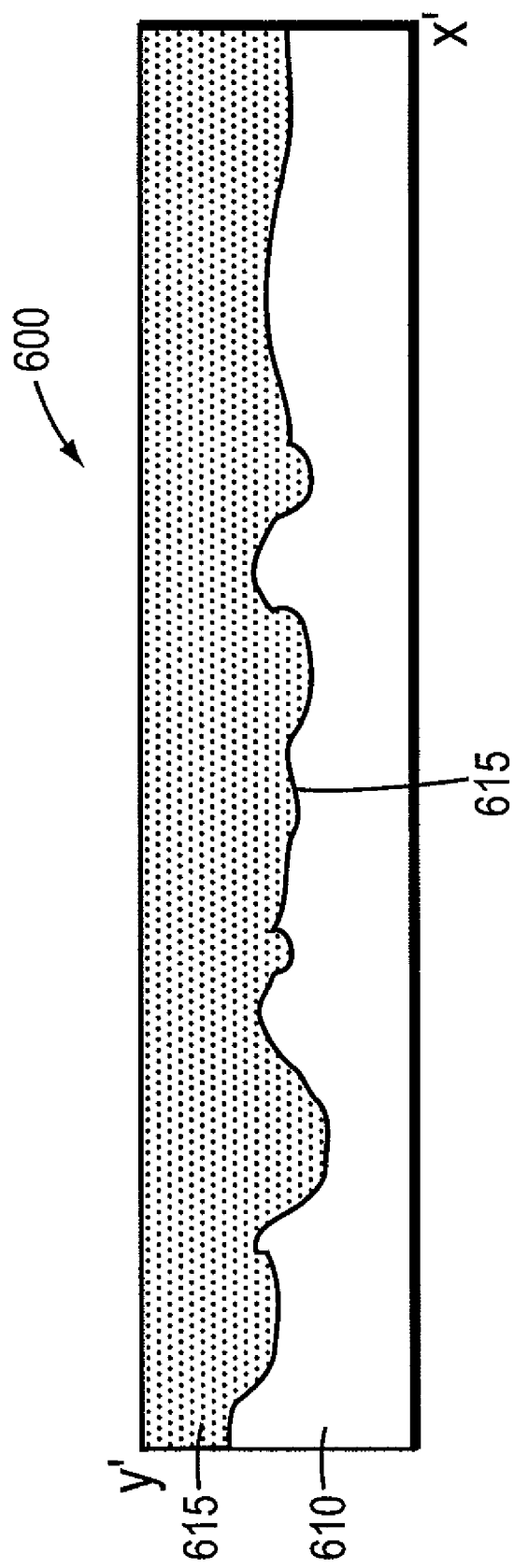
FIG. 6 illustrates an ideal boundary image in accordance with an embodiment of the invention.
Figure 7:
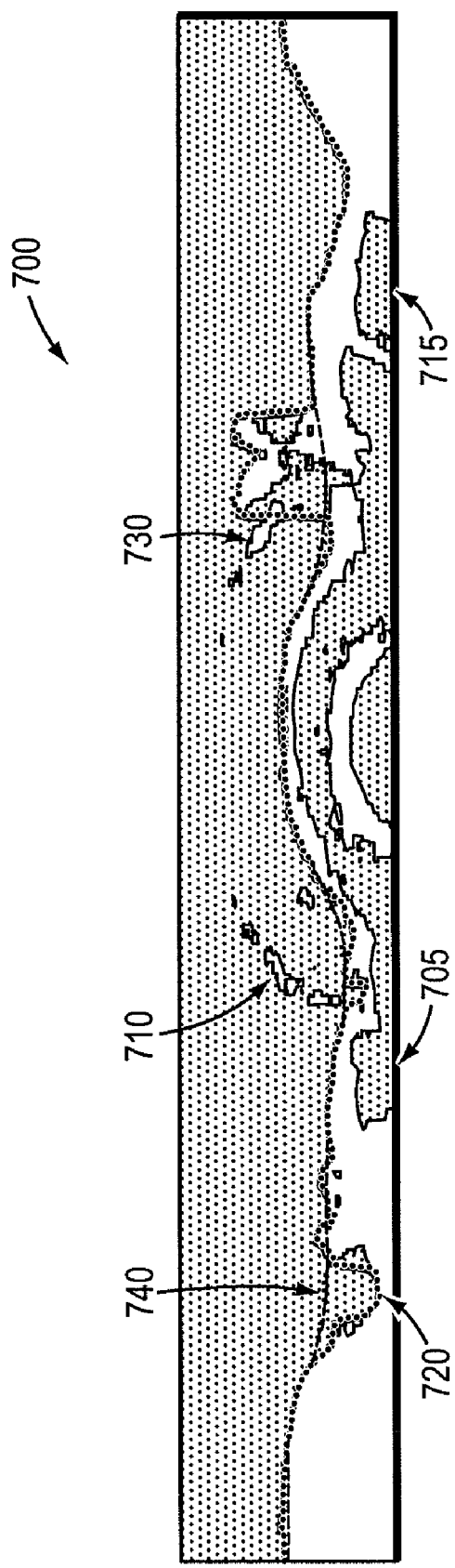
FIG. 7 is an image depicting a binary boundary curve in accordance with various embodiments of the invention.

Referring to FIG. 6, the binary image produced by applying a threshold (step 515) would ideally produce a contiguous block 610 of binary ones along the bottom of the boundary image 600, clearly distinct from a contiguous block of binary zeros along the top 615 of the image 600, and defining the separating line 615 between the two blocks. In real images the results are not ideal, and therefore additional processing is used to identify the separating line. The "real world" image 700 shown in FIG. 7 includes incomplete sections representatively indicated at 705 (due to weak edges in the images, for example); islands of ones are present in the zero block 710 and islands of zeros are present in the one block 715 due to image noise and internal structures of an organ. The latter case can be treated using an island-sorting method that sorts binary islands produced by thresholding, and removes islands that are less likely to contain the true organ edge, as described in greater detail below.

In some embodiments, the binary image of step 515 is derived using gradient or Laplacian edge-detection techniques, or a combination of these two approaches. Gradient filters can be applied either to the globally normalized boundary image, to the locally normalized boundary image, or to the weighted-sum boundary image.

In other embodiments, the binary image is produced using a threshold calculated from both globally and locally normalized images (i.e., from the weighted-sum boundary image). Binary islands within the binarized boundary image are labeled as such, and their lengths in the x-direction are calculated. Binary islands having a length less than some predefined length parameter, such as 5 pixels, can be considered to be noise and removed. Islands having a center of mass above a line defined by another predefined parameter (e.g., 4, such that islands having center of mass above ¼ of the width of the boundary image in the y direction) can also be removed, as the correct edge is more likely to be in the center area of the boundary image (and thus outlier islands are much less likely to include correct edge information).

Once the outliers are removed, the binary islands are sorted. First, the remaining islands are re-labeled. Further, because the re-mapping process is initiated at an arbitrary two-dimensional point on the initial boundary estimate (in global coordinates), a binary island can be artificially broken into two parts, and therefore a determination is made if islands on the left edge and on the right edge of the boundary image should in fact be connected. All islands are then sorted by their length in the x-direction in boundary space coordinates. Although sorting can be done using the total length of the island, the x-direction length is preferably used because the x-coordinate represents approximately the same direction as the edge curve. The longer the island, the higher is the probability that it contains the true edge; accordingly, the islands are selected one by one starting with the longest, and edge points are extracted and added into an edge curve vector, such that points from the longer islands overwrite points from the shorter islands.

The edge-detection operation (step 525) on a given binary island comprises detecting the jump from zero to one while moving along the inside-to-outside direction (i.e., from the inside of the organ to the outside of the organ). This process corresponds to finding the first maximum in each line in the boundary image. In the ideal situation of FIG. 6, the first maximum is the interface line 615. In the non-ideal situation of FIG. 7, points where no binary island exists can be set to zero to be interpolated at a later stage.

In one embodiment, step 530 is carried out as follows. The result of edge detection is used as input into a local concavity-removal process. Local concavities typically appear at the boundary where contrast is weak or absent, e.g., when an organ is not completely encompassed within the image boundaries. In one embodiment of the local concavity removal process, the first Gaussian derivative is calculated at every point of the boundary curve, and the locations of strong derivatives denoting large jumps between data points (which are usually associated with concavity artifacts) are found. For instance, an inward concavity region 720 corresponds to the first strong negative derivative followed by a positive spike. However, since there can be multiple jumps in derivatives associated with the concavity, the jump that is farthest from the initial point (but which does not exceed the pre-defined parameter corresponding to the maximum concavity length) is identified. A similar method can be used to identify an outward concavity 730. If a false concavity region is found, the data points are removed by setting values of curve points (y-coordinates) to zero. Confidence weights can be defined for each point, based on an estimation of the reliability of given edge point to be true edge, and are set to zero for removed points. The next step involves interpolation of the removed, or zero-weight, points. One embodiment uses a finite-difference interpolation. Another uses a weighted cubic-spline smoothing function, which fits a cubic spline function through a set of data points using their confidence weights and a general roughness parameter. The function minimizes two contradictory terms, namely, the so-called natural cubic spline (which joins the data points with cubic polynomial sections) and the linear least-square fitting of the data points. The concurrent ratio is tuned using the overall roughness parameter: zero for pure least-square through one for a pure natural cubic spline. Between these extremes, the outcome is a smoothed cubic spline which will fit the data points more or less rigidly, depending on the overall roughness parameter and on the per-data-point weight. The computed curve is attracted to high-confidence points and is looser around low-confidence points. In some embodiments, zero-weighted data points can be skipped, in which case these points are not considered during the cubic spline smoothing; rather, the curve around these points is interpolated based on the weighted surroundings. Once the missing data is removed, the processed edge curve 740 is output back to the CLT process.

In another embodiment of the invention, the segmentation step 215 may be accomplished using level sets to segment the lesion boundary 145 and find gradient points. The points are then smoothed and connected to form the boundary curve, e.g., using level sets. Other suitable techniques such as active contours, active shapes, deformable templates, graph-based segmentation, statistical clustering, Markov random field-based techniques or active-appearances methods may also be used in various embodiments of the invention to segment the boundary image.

In some embodiments, the gradient identified in the boundary images is not sufficient to find the correct boundary line, in which case other features, such as texture or grayscale patterns, are recognized instead of image gradients.

Although embodiments of the invention are described above with reference to two-dimensional images, medical applications often require the segmentation of three-dimensional images such as CT, MRI, PET, SPECT or three-dimensional ultrasound. In such cases, the three-dimensional images can be separated into one or more sets of two-dimensional images. For example, a three-dimensional volume can be divided into a number of two-dimensional parallel slices, or two-dimensional rotational slices about an axis of rotation. The foregoing techniques can then be applied to each individual two-dimensional image, and each segmented curve can be joined to form a full three-dimensional mesh. In some embodiments, the contour of one slice can be used as the initial contour of a neighboring slice. In some instances, however, the final three-dimensional surface mesh may not be smooth because it consists of independent two-dimensional contours. In such cases, a conventional smoothing technique can be used on the final three-dimensional mesh, or a separate three-dimensional segmentation process such as the well-known three-dimensional discrete dynamic contour method, can be used to refine the mesh.

In some embodiments, the three-dimensional nature of the image can be used directly by the BRP method. Instead of forming two-dimensional boundary images, the region around the surface is converted into a three-dimensional boundary region. In this approach, finding the organ boundary involves fitting a two-dimensional plane onto a thresholded three-dimensional surface. By copying the three-dimensional boundary image and concatenating it to each side of the three-dimensional image, the topology of the original three-dimensional image is retained and the continuity of the image is preserved. In another embodiment of the invention in which the BRP technique is applied to a series of two-dimensional cuts through a three-dimensional volume, as previously described, knowledge of the adjacent boundary images is used when finding the boundary curves of each of the two-dimensional boundary images to assure three-dimensional continuity and consistency—i.e., for every potential edge point 615, a three-dimensional neighborhood is extracted to determine the validity of the current edge point.

The techniques disclosed herein can be used alone or in combination with other previously disclosed segmentation techniques. Non-limiting examples of such techniques include histogram-based segmentation, boundary-based segmentation, region-bases segmentation and/or hybrid-based segmentation.

Figure 8:
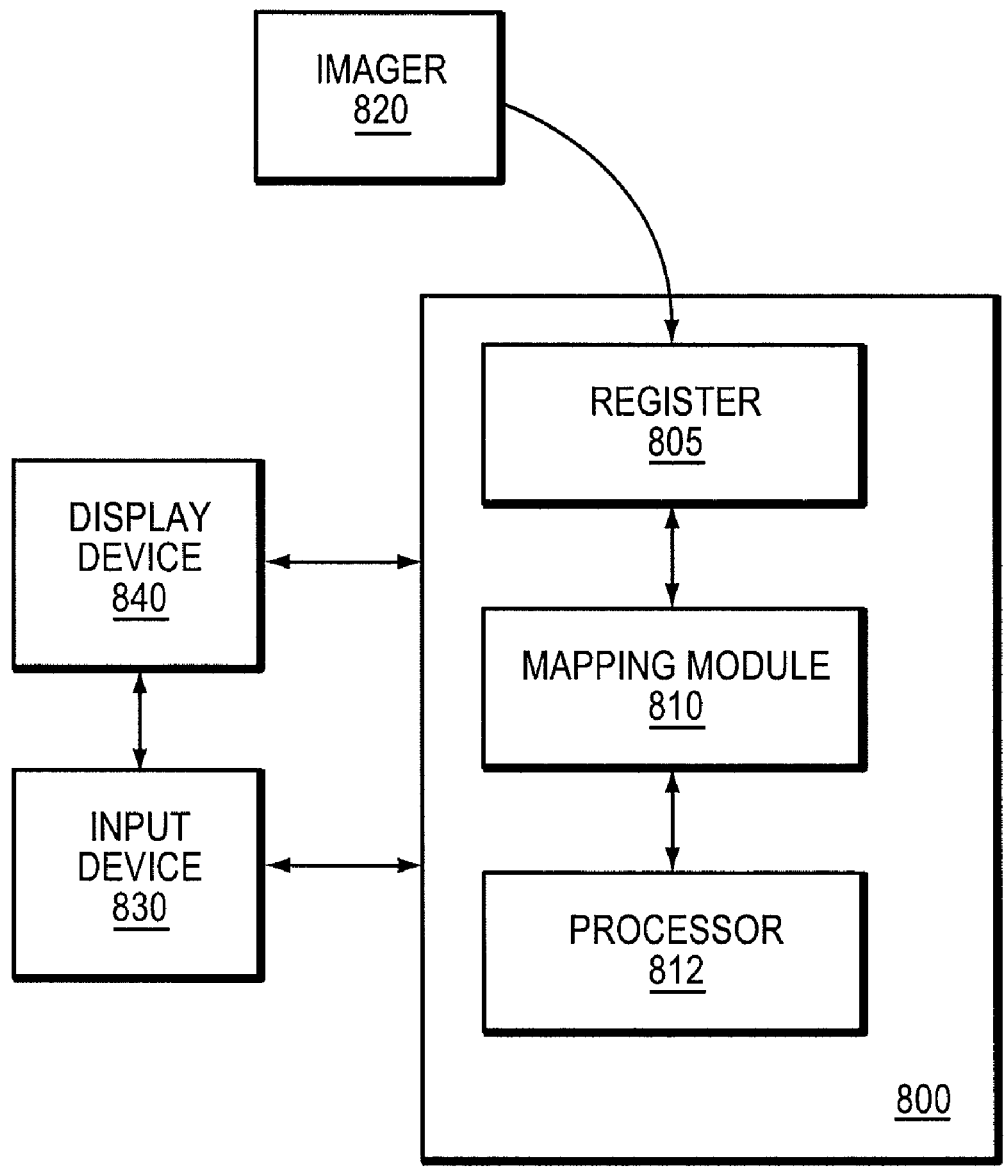
FIG. 8 is a schematic representation of a system for performing the methods described herein in accordance with an embodiment of the invention.

FIG. 8 schematically depicts a hardware embodiment of the invention realized as a system 800 for determining the edge boundaries of an imaged organ or lesion. The system 800 comprises a register 805, a segmentation module 810, and a processor 812.

The register 805, which may be any suitably organized data storage facility (e.g., partitions in RAM, etc.), receives images from an imager 820 such as an MRI, CT/PET scanner, ultrasound device, or x-ray device. In some embodiments, the images are stored on a data-storage device separate from the imager (e.g., a database, microfiche, etc.) and sent to the system 800. The register 805 may receive the images through conventional data ports and may also include circuitry for receiving analog image data and analog-to-digital conversion circuitry for digitizing the image data.

The register 805 provides the image to the mapping module 810, which performs the boundary band determination and segmentation as described above. The initial boundary band can be determined programmatically and/or manually. Where manual input and manipulation is used, the system 800 receives instructions from a user via an input device 830 such as a mouse or other pointing device. Results of the banding and segmentation can also be viewed using a display device 840 such as a computer display screen or hand-held device. The boundary estimate and initial image are then sent to the processor 810 which, based on the segmentation results, identifies a new boundary band estimate as described above.

In some embodiments, the register 805, mapping module 810 and processor 812 may implement the functionality of the present invention in hardware or software, or a combination of both on a general-purpose computer. In addition, such a program may set aside portions of a computer's random access memory to provide control logic that affects one or more of the image manipulation, segmentation, and display. In such an embodiment, the program may be written in any one of a number of high-level languages, such as FORTRAN, PASCAL, C, C++, C#, Java, Tcl, or BASIC. Further, the program can be written in a script, macro, or functionality embedded in commercially available software, such as EXCEL or VISUAL BASIC. Additionally, the software can be implemented in an assembly language directed to a microprocessor resident on a computer. For example, the software can be implemented in Intel 80×86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM.

While the invention has been particularly shown and described with reference to specific embodiments, it should be understood by those skilled in the area that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A computer-implemented method of generating a segmented image of an anatomical structure, the method comprising:
    a) providing, from a register to a mapping module, an initial boundary estimate of the anatomical structure;
    b) determining, by the mapping module, a boundary band region that includes the initial boundary estimate of the anatomical structure by sampling image data along a series of lines normal to the initial border estimate;
    c) converting the boundary band region to a rectangular boundary image and the boundary estimate to a curve within the rectangular boundary image such that the boundary estimate is defined relative to a coordinate grid of the rectangular boundary image;
    d) using a processor, (i) segmenting the boundary estimate within the rectangular boundary image and (ii) mapping the segmented boundary estimate from the rectangular boundary image onto the boundary band region to obtain a segmented boundary estimate;
    e) repeating steps b) through d) using the segmented boundary estimate from the rectangular boundary image as the initial boundary estimate within an updated boundary band, until the tolerance difference is below a threshold; and
    (f) generating, using the processor, an improved segmented image of the anatomical structure from the segmented boundary estimate.

2. The method of claim 1 further comprising obtaining a tolerance difference between the segmented boundary estimate and the initial boundary estimate.

3. The method of claim 2 wherein the threshold is modified for at least one repetition of steps b) through d).

4. The method of claim 2 wherein a width of the boundary band is adjusted for at least one iteration of steps b) through d).

5. The method of claim 1 wherein determining the boundary band comprises the mapping module expanding the initial boundary estimate in multiple directions by a predefined amount.

6. The method of claim 1 wherein the step of determining the boundary band comprises the mapping module sampling image data along a series of lines normal to the initial boundary estimate and mapping the sampled data into a rectangular array.

7. The method of claim 1 wherein the step of determining the boundary band comprises the mapping module sampling image data using a plurality of co-radial lines, each of the lines passing through the initial boundary estimate, and mapping the sampled data into a rectangular array.

8. The method of claim 1 wherein the step of determining the boundary band comprises the mapping module sampling image data with one or more curved lines passing through the initial boundary estimate and mapping the sampled data into a rectangular array.

9. The method of claim 1 wherein the step of segmenting the boundary band comprises the processor:
    i) calculating a weighted-sum image comprising global and local statistics of the image;
    ii) applying one or more thresholds to the weighted-sum image to form a binary image;
    iii) detecting an edge curve based on the binary image; and
    iv) modifying one or more data points along the edge curve.

10. The method of claim 1 wherein the step of segmenting the boundary band comprises the processor using one or more of level sets, active contours, active shapes, deformable templates, graph-based techniques, statistical clustering, Markov random field-based techniques or active-appearances methods.

11. The method of claim 1 wherein the step of segmenting the boundary band comprises the processor implementing one or more of thresholding of the boundary band, gradient edge-detection or Laplacian-edge detection to detect an edge in the boundary band.

12. The method of claim 1 wherein the step of segmenting the boundary band comprises the processor using texture information to detect an edge in the boundary band.

13. The method of claim 9 further comprising the processor deriving the thresholds based on statistical measurements of the image.

14. The method of claim 13 wherein the statistical measurements comprise one or more of a mean of the weighted sum of the image or an estimate of the mean of the image.

15. The method of claim 9 wherein the thresholds are determined using one or more of gradient edge-detection methods, Laplacian edge-detection methods or second-derivative gradient-direction edge-filter methods.

16. The method of claim 9 further comprising the processor removing false binary islands.

17. The method of claim 9 wherein modifying one or more data points along the edge curve comprises removing false local concavities.

18. The method of claim 9 wherein modifying one or more data points along the edge curve comprises removing erroneous edge points, and fitting a spline curve through remaining edge points.

19. The method of claim 1 wherein the image is a three-dimensional image, and further comprising the processor dividing the three-dimensional image into a plurality of two-dimensional images prior to performing steps b) through d) thereon.

20. The method of claim 19 further comprising the processor forming a three-dimensional mesh from the two-dimensional segmented boundary estimates generated by performing steps b) through d) on the plurality of two-dimensional images.

21. The method of claim 19 further comprising maintaining continuity between the two-dimensional segmented boundary estimates.

22. The method of claim 19 wherein the new segmented boundary band is based, at least in part, on data sampled from points in proximity to the initial boundary estimate.

23. The method of claim 1 wherein the initial boundary estimate is arbitrarily defined.

24. The method of claim 1 wherein the initial boundary estimate user-provided.

25. The method of claim 1 where the initial boundary estimate is based, at least in part, on a limited number of user-provided points.

26. A system for generating a segmented image of an anatomical structure, the system comprising:
 a) a register for receiving an image and an initial boundary estimate of an anatomical structure represented in the image; and
 b) a mapping module for:
  i) determining a boundary band region that includes the initial boundary estimate of the anatomical structure by sampling image data along a series of lines normal to the initial border estimate; and
  ii) converting the boundary band region to a rectangular boundary image and the boundary estimate to a curve within the rectangular boundary image such that the boundary estimate is defined relative to a coordinate grid of the boundary image; and
 c) a processor for:
  ii) segmenting the boundary estimate within the rectangular boundary image;
  iii) mapping the segmented boundary estimate from the rectangular boundary image onto the boundary band region to obtain a segmented boundary estimate; and
  iv) generating a segmented image of the anatomical structure from the segmented boundary estimate;
  wherein the mapping module and processor iteratively segment and map the segmented boundary band using the new boundary estimate generated based on the rectangular boundary image as the initial boundary estimate within the boundary band.

27. The system of claim 26 wherein the image is obtained using one of a CT scanner, a three-dimensional ultrasound device, a PET scanner, a SPECT scanner and an MRI.

28. An article of manufacture having computer-readable program portions embodied thereon for segmenting representations of an anatomical structure in an image, the article comprising non-transitory computer-readable instructions for:
 a) providing an initial boundary estimate of the anatomical structure;
 b) determining a boundary band that includes the initial boundary estimate of the anatomical structure by sampling image data along a series of lines normal to the initial border estimate;
 c) converting the boundary band region to a rectangular boundary image and the boundary estimate to a curve within the rectangular boundary image such that the boundary estimate is defined relative to a coordinate grid of the rectangular boundary image;
 d) segmenting the boundary estimate within the rectangular boundary image;
 e) mapping the segmented boundary estimate from the rectangular boundary image onto the boundary band region to obtain a segmented boundary estimate;
 f) repeating steps b) through e) using the segmented boundary estimate from the rectangular boundary image as the initial boundary estimate within the boundary band, until the tolerance difference is below a threshold; and
 g) mapping the segmented boundary band onto the image, thus providing a segmented boundary estimate.

* * * * *